United States Patent [19]

Klein et al.

[11] 4,434,320
[45] Feb. 28, 1984

[54] CONTRACTIBLE CONDUIT SEALING CONNECTOR

[75] Inventors: Gary S. Klein, Bedford Heights; William J. Herbert, Mantua, both of Ohio

[73] Assignee: Eaton Corporation, Cleveland, Ohio

[21] Appl. No.: 350,980

[22] Filed: Feb. 22, 1982

[51] Int. Cl.³ .............................................. H02G 3/04
[52] U.S. Cl. ................................ 174/23 R; 174/77 R; 174/DIG. 8; 285/381
[58] Field of Search ............ 174/23 R, 23 C, DIG. 8, 174/92, 76, 77 R; 169/48; 285/381

[56] References Cited

U.S. PATENT DOCUMENTS

| | | | |
|---|---|---|---|
| 1,283,574 | 11/1918 | Schuster et al. | 174/76 |
| 2,198,368 | 4/1940 | Lavarack | 174/75 B |
| 3,717,717 | 2/1973 | Cunningham et al. | 174/DIG. 8 X |
| 3,728,466 | 4/1973 | Rocton et al. | 174/23 R |
| 3,837,686 | 9/1974 | Powell | 285/382 X |
| 3,847,183 | 11/1974 | Meyer | 174/DIG. 8 X |
| 3,864,883 | 2/1975 | McMarlin | 169/48 X |
| 3,913,444 | 10/1975 | Otte | 174/DIG. 8 X |
| 3,990,661 | 11/1976 | De Groef | 174/DIG. 8 X |
| 4,035,007 | 7/1977 | Harrison et al. | 285/381 |
| 4,093,818 | 6/1978 | Thwaites et al. | 174/48 |
| 4,099,020 | 7/1978 | Kohaut | 174/48 |
| 4,135,743 | 1/1979 | Hughes | 285/115 |
| 4,149,911 | 4/1979 | Clabborn | 285/381 X |
| 4,226,448 | 10/1980 | Broyles | 285/381 |
| 4,287,034 | 1/1981 | Pieslak et al. | 174/DIG. 8 X |
| 4,310,184 | 1/1982 | Campbell | 285/382 |
| 4,319,074 | 3/1982 | Yaste et al. | 174/23 R |

FOREIGN PATENT DOCUMENTS

| | | | |
|---|---|---|---|
| 2052683 | 5/1972 | Fed. Rep. of Germany | 169/48 |
| 1431167 | 4/1976 | United Kingdom | 174/DIG. 8 |

OTHER PUBLICATIONS

Masterson, J. B.; "Pressure Dams in Communication Cables"; Wire & Wire Products; May 1970; pp. 61-65.
Crouse-Hinds Company—"Condulet Seals, Breathers, Drains" dated Aug. 1974.
Crouse-Hinds Company—"Condulet Sealing Fittings" Dated Jun. 1980.

*Primary Examiner*—R. L. Moses
*Assistant Examiner*—Morris H. Nimmo
*Attorney, Agent, or Firm*—C. H. Grace; A. E. Chrow

[57] ABSTRACT

Disclosed is contractible conduit sealing connector that features an expanded sleeve made from a heat recoverable metallic material which when exposed to a sufficient amount of heat is able to contract and secure at least two conduits together while at the same time enabling an expandable material contained within a chamber of the sleeve to expand and engulf any electrical conductors and/or cables extending through the connector between the conduits and fill the chamber sufficiently to provide a barrier against the flow of vapor through the conduits.

17 Claims, 6 Drawing Figures

CONTRACTIBLE CONDUIT SEALING CONNECTOR

INTRODUCTION

This invention relates generally to a connector for connecting the ends of conduit together for protecting one or more electrical conductors passing from one conduit to the other and more particularly to such connector in the form of a sleeve made from a heat recoverable metallic material which is provided with an expandable material disposed within a chamber of the sleeve that is adapted to expand and engulf the conductor without damage thereto and fill the chamber sufficiently to provide a barrier against the flow of vapor through the conduits connected together by the sleeve in response to the contraction of the sleeve by heat.

BACKGROUND OF THE INVENTION

It is common practice to pass electrical conductors and cable through conduit (typically metal conduit) from one point to another as a means of providing support and protection for the conductors and cables.

The term "conduit" refers to pipe having dimensional and other characteristics suitable for use by the electrical industry as is well known to those ordinarily skilled in the art. Although hereinafter referred to as conduit, it is to be understood that the term "conduit" as used herein means metal conduit also includes metal pipe which is not conduit but able to serve the purpose of conduit where desired.

Conduit may often inadvertently or unavoidably provide a passage-way from a region in which explosive, corrosive, toxic or otherwise undesirable vapors are present to a region free of such vapors. In an effort to prevent the passage of such vapors through the conduit to the vapor-free region, it has been common practice in the past to pack the openings between the conduit and the conductors and cables with some type of heavy pliable material. In recognizing the problem, minimum performance criteria have been established under relevant sections of the National Electrical Code for controlling the manner in which conduit located in hazardous locations is sealed.

The manner in which conduit has been sealed in the past, however, has typically involved expensive fittings of complex design that are commonly adapted to be used in conjunction with sealant materials which may require mixing of several components to impart sufficient viscosity to withstand the pressure of the vapors and require costly inventory of multiple components.

One method commonly used for sealing electrical conductors at a junction between conduit are metal connectors sold by Crouse-Hinds Company under series numbers EYS, EZS, EYD, EZD and ECD. The connectors feature a port filling entrance into which a sealant, recommended and sold by Crouse-Hinds Company under the Trademark "Chico" can be poured to provide a barrier against the flow of vapor through the conduits. The connectors further feature the use of a fiber sold by Crouse-Hinds Company under the Trademark "Chico & Fiber" for providing a dam within the connector to prevent the flow of the sealing compound into the conduits.

Another method of connecting tubing together is by the use of couplings made from a heat recoverable metal such as described in U.S. Pat. Nos. 4,035,007 and 4,135,743, the disclosures of which are incorporated herein by reference. Couplings of this type are made from special alloys such as nickel and Titanium alloys which if expanded in the martensitic state will contract radially inwardly when heated from the martensitic to the austenitic state. As used herein the term "heat recoverable metal" (or metallic material) means metallic materials including the materials disclosed in the above reference patents and other alloys such as alloys of copper, zinc and aluminum which, when shaped into the form of a coupling, are able to shrink and contract tightly about the end of metal tubing in response to a suitable amount of heat and firmly grip the tubing over its normal temperature usage range.

Although couplings in the form of a sleeve made from a heat recoverable metallic material may be used to advantage in connecting a junction between metal conduits, they would not by themselves provide a solution to providing individual protection to one or more electrical conductors contained within the space between the conduits nor would they prevent dangerous or otherwise undesirable vapor from using the conduit as a passageway from one location to another.

In view of the need to provide a simple and low cost method of connecting metal conduit to individually protect one or more electrical conductors extending through a connector between the conduits in addition to providing a barrier against the flow of vapor through the conduits represents a problem which, although long known to industry, has not, up until the time of the present invention, had a completely satisfactory solution.

SUMMARY OF THE INVENTION

Accordingly, it is an object of this invention to provide a connector for connecting at least two metal conduits together that are also able to provide a barrier against flow of vapor through the conduits in a simple and inexpensive manner.

It is another object of this invention to provide a connector for connecting at least two electrical conductor and/or electrical cable containing metal conduits together that is simple to use and is preferably able to electrically insulate the conductors and/or cables from each other at the junction between the conduit ends as well as provide a barrier against the flow of vapor through the conduits in a simple manner without the necessity of having to inventory multiple components.

It is a feature of this invention to provide a connector made from a heat recoverable metallic material which by the simple application of a suitable amount of heat is able to contract against at least two metal conduits and secure them together as well as providing a means of simultaneously individually protecting electrical conductors and/or cables extending through the connector between the conduits in addition to providing a barrier against the flow of vapor through the conduits.

DESCRIPTION OF PREFERRED EMBODIMENTS

Figure 1:
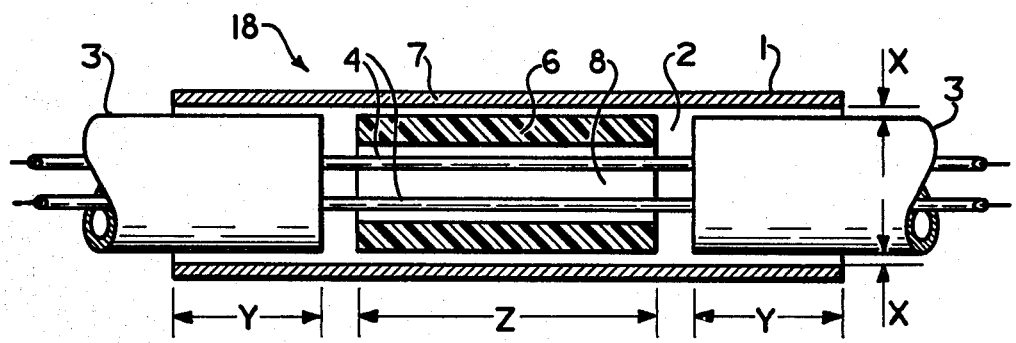
FIG. 1 shows an axial longitudinal section through an embodiment of the connector of the invention prior to its contraction by heat.

FIG. 1 shows an embodiment of the invention in the form of connector 18 prior to its contraction by exposure to heat. Connector 18 comprises an open-ended, hollow, generally tubular shaped sleeve 1 that is made from a heat recoverable metallic material that is able to contract radially inwardly upon exposure to a sufficient amount of heat as previously described. Sleeve 1 has an annular shaped wall 7 enclosing a chamber 2 therewithin that communicates with an opening, not referenced, at one end of sleeve 1 for receiving the end of one conduit 3 and which communicates with an opening, not referenced, at the opposite end of sleeve 1 for receiving the end of another conduit 3. Conduits 3 for all embodiments of the invention are made from a metallic material with the ends thereof spaced apart from each other within sleeve 1. Wall 7 of sleeve 1 has an outer surface, not referenced, and an inner surface, not referenced, of which at least a portion thereof faces towards electrical conductors 4 extending between conduits 3 through chamber 2. The overall axial length of sleeve 1 is sufficient to enable conduit 3 to be respectively inserted for a distance "Y" into opposite ends of sleeve 1 sufficiently to achieve the degree of securement desired therebetween when sleeve 1 is contracted against conduits 3 by heat. Although conduits 3 and sleeve 1 are shown as being axially aligned, it is to be understood that such is for illustrative purposes only and the embodiments of the connector of the invention include those which are able to accommodate and connect at least two conduits that may or may not be axially aligned such as connector 22 hereinafter described with respect to FIG. 6.

Sleeve 1 is in an expanded state established by expanding it with a mandrel or the like when at a temperature in the martensitic range. Sleeve 1 is expanded such that there is a radial clearance of "X" between the outer surface of conduit 3 and the inner surface of sleeve 1. Typically the inside diameter of sleeve 1 in the expanded state at least for the distance "Y" at the opposite ends thereof is about 4% larger than the outer diameter of conduit 3 so that conduit 3 can be respectively inserted with ease into the opposite ends of sleeve 1 and, upon exposure to a sufficient amount of heat, sleeve 1 is able to contract tightly against the outer surface of conduit 3 to connect them together in a secure manner. Electrical conductors 4 pass through conduits 3 and sleeve 1 of connector 18.

An annular layer of expandable material 6 is disposed loosely on the inner surface of wall 7 within chamber 2 for a distance "Z" between the opposite ends of conductor 3. The layer of expandable material 6 has an inside diameter large enough to provide an open-ended cavity 8 therethrough through which conductors 4 are able to pass from one conduit 3 to the other before sleeve 1 is contracted by heat. Length "Z" and the thickness of the layer of material 6 is sufficient to provide the amount of material 6 desired between the opposed ends of conduit 3 and may have its opposite ends abutting the opposite ends of conduit 3 where such is desired. Length "Z" of the material 6 layer is not so long as to interfere with the insertion of conduit 3 for the distance "Y" into opposite ends of sleeve 1 as previously described. Material 6 is dimensionally adapted such that upon exposing sleeve 1 to a sufficient amount of heat to contract sleeve 1 tightly against conduit 3, material 6 is able to expand and engulf conductor 4 without damage thereto and fill chamber 2 sufficiently to provide a barrier against the flow of vapor through conduit 3 from one to the other as hereinafter described with respect to FIG. 2.

Material 6 may be adhesively secured to the inner surface of wall 7 of sleeve 1 in any suitable manner such that it adheres to and remains secured to the inner surface of sleeve 1 during the process of connecting conduits 3 together. Material 6, for all embodiments of the connector of the invention, may be made from any expandable material that is able to expand in the manner previously described and not be degraded by the amount of heat required to contract sleeve 1 and not be degraded by the type of vapor being conveyed by any one of the conduits connected to sleeve 1 in addition to having the ability to provide a barrier against the flow of the vapor through the conduit connected by the connector. Preferably, material 6 is a material that is able upon its exposure to electrically insulate the electrical conductors and/or cables from each other that extend between the conduits connected together by the connector of the invention. Material 6 may, for example, be made from a material that is caused to foam in response to the amount of heat required to contract the sleeve of the connector of the invention. Material 6 may also, for example, contain an amount of heat activatable cross-linking agent sufficient to cross-link material 6 upon its expansion from the heat required to contract sleeve 1. Material 6 may be a halogenated or a non-halogenated polymeric material that is adapted to expand and engulf conductors 4 and fill chamber 2 when subjected to a sufficient amount of heat. Material 6 may also be a heat reactive intumescent material such as a silicone, epoxy, polyester, polyolefin, polyurethane, acrylic or siliceous material or certain ceramic materials or blends of such materials which may further include chemical blowing agents, catalysts, exothermic reagents, intumescing agents, gas generators, sensitizers for crosslinking and the like. An example of a particular material found to be of advantage as material 6 for use in the connector of the invention is an ethylene vinyl acetate-polyolefin copolymer compound containing an amount of di-cumyl peroxide sufficient to cause the compound to expand when subjected to heat and engulf conductors 4 and fill chamber 2 sufficiently to provide a barrier to the flow of vapors through the connector from one conduit to the other in addition to becoming crosslinked during the expansion process.

Figure 2:
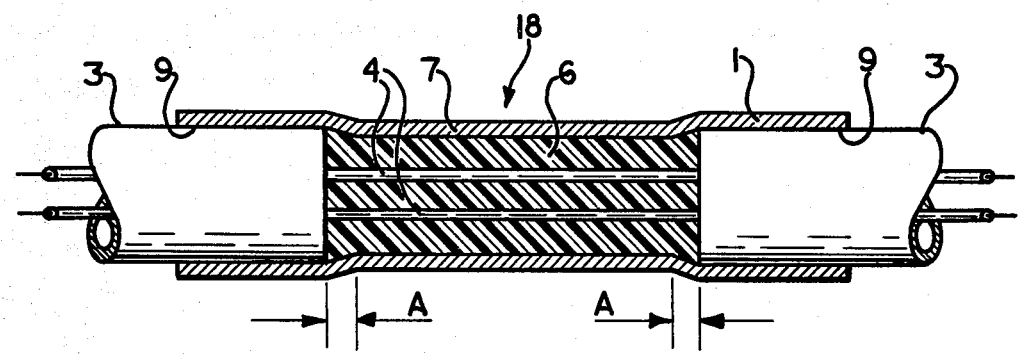
FIG. 2 shows an axial longitudinal section of the connector embodiment of FIG. 1 after its contraction by heat.

FIG. 2 shows connector 18 after sleeve 1 has been contracted by heat to connect conduits 3 together by causing the inner surface of sleeve 1 to press firmly against conduits 3 at the interface 9 therebetween. Sleeve 1 is heated by heating the outer surface of wall 7 thereof in any suitable manner that is able to provide the amount of heat required to expand material 6. As shown in FIG. 2, material 6 has expanded both radially outwardly and radially inwardly to engulf conductors 4 and fill chamber 2 of sleeve 1 sufficiently to provide a barrier against the flow of vapor through conduits 3. Material 6 has also expanded axially along the length of sleeve 1 to within a distance "A" of the respective ends of conduits 3. In other embodiments of the invention, the particular material 6 chosen may decrease in its axial length rather than lengthen when the material is expanded by the heat required to shrink the heat recoverable metal sleeve of the connector of the invention.

Figure 3:
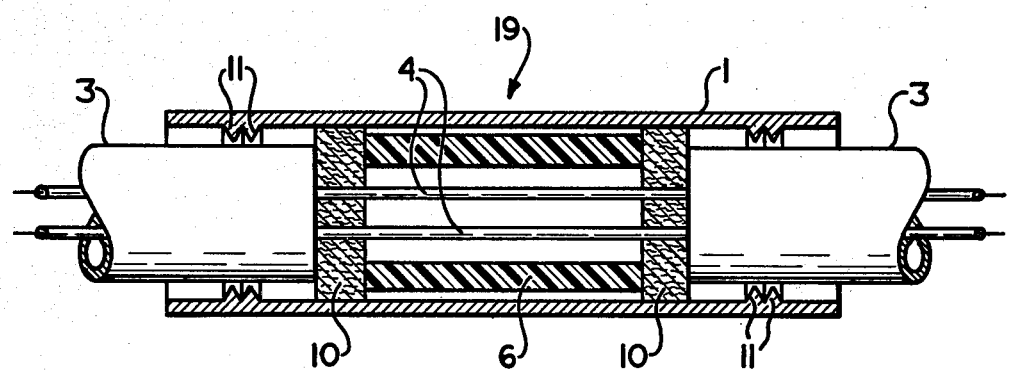
FIGS. 3 through 6 show an axial longitudinal section of other embodiments of the connector of the invention prior to their contraction by heat.

In FIG. 3, connector 19 is substantially the same as previously described with respect to connector 18 of FIG. 1 with the inclusion of barrier members 10 disposed between opposite ends of the layer of material 6 and the end of conduits 3 and protuberances 11 disposed in the inner surface of sleeve 1 to enhance its securement to conduits 3. Barrier members 10 provide a barrier against the flow of the material 6 layer in an axial direction when it is expanded by heat. Barriers 10 may be made from any suitable material that does not interfere with the contraction of sleeve 1 onto conduits 3 and that can withstand the heat required for contracting sleeve 1 against conduits 3. Barriers 10 must also enable conductors 4 to pass through sleeve 1 from one conduit 3 to the other. Although barriers 10 may be made from any suitable material, barriers 10 shown in FIG. 3 are in the form of a fibrous material, such as fibrous glass, disposed in the space between the opposite ends of the material 6 layer and the ends of conduit 3 since fibrous glass has high temperature resistance and is easily compressed by the contraction of sleeve 1. Barriers 10 may also be made from a heat recoverable metallic or polymeric material whose recovery temperature is not higher than about the contraction temperature of sleeve 1.

Although protuberances 11 are shown in FIG. 3 in the form of a plurality of annular barbs extending radially inwardly towards conduits 3, protuberances 11 may comprise any disruption of the inner surface of sleeve 1 such as one or more grooves or one or more individual prongs or barbs or the like that enable sleeve 1 to deform the outer surface of conduits 3 sufficiently to enhance the gripping engagement therebetween when sleeve 1 is contracted onto conduits 3 by heat.

Figure 4:
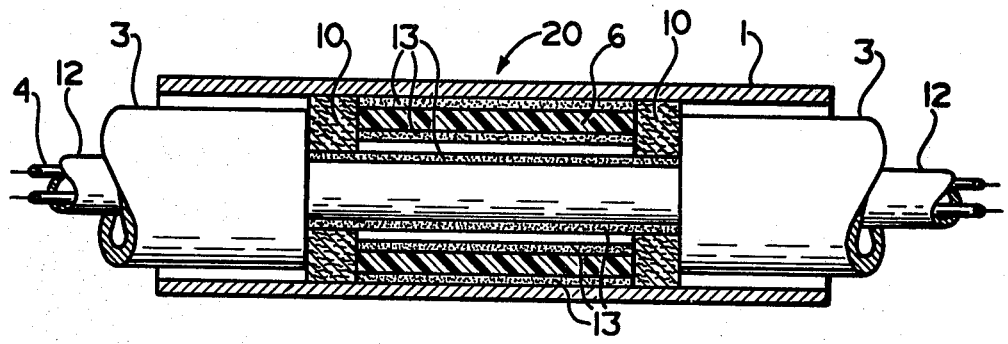

In FIG. 4, connector 20 is substantially the same as connector 18 of FIG. 1 except that the layer of previously described expandable material 6 is bonded to the inner surface of sleeve 1 by means of an adhesive layer 13. Conductors 4 are components of an electrical cable 12 which extends through sleeve 1 and conduits 3. A layer of adhesive 13 is disposed directly about cable 12 within sleeve 1 to effect a bond between cable 12 and material 6 upon its expansion caused by the heat required to contract sleeve 1 against the outer surface of conduits 3. A layer of adhesive 13 is also disposed on the inner surface of the layer of material 6 facing towards cable 12 to bond material 6 to cable 12 when it is expanded by heat to enhance the ability of expanded material 6 to provide a barrier against the flow of vapor from one conduit to the other. Adhesive 13 may be any adhesive that is able to suitably maintain its integrity while bonding material 6 to sleeve 1 and cable 12 after its expansion and maintain the bond under the particular application conditions to which sleeve 1 and conduits 3 are to be exposed. The types of adhesive 13 used at the various locations within sleeve 1 or between the region of securement of sleeve 1 and conduits 3 may differ as required for a particular application.

Means for preventing galvanic corrosion such as a suitable liner, or an adhesive such as adhesive layer 13 were suitably effective, or a suitable polymeric coating on either or both the outer surface of the conduits and the inner surface of sleeve 1 in the region of securement therebetween may be used to prevent such galvanic corrosion in the event that the metal from which the conduits and heat recoverable sleeve are made are apt to promote galvanic corrosion because of their adjacent contacting relationship after the connector of the invention has been contracted against the conduits by heat.

Figure 5:
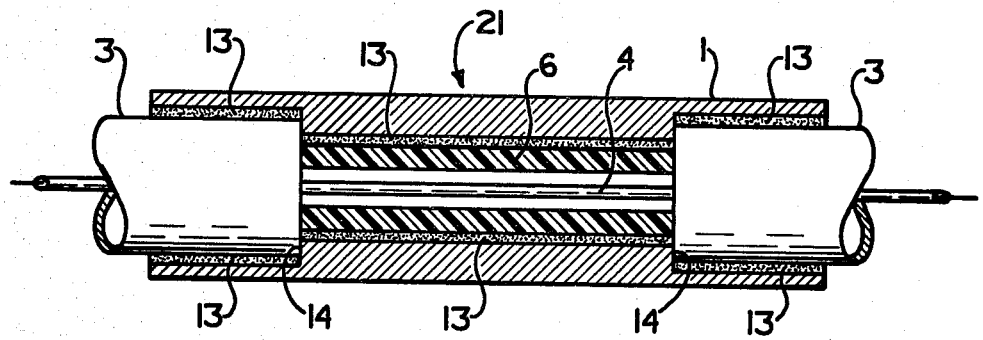

In FIG. 5, connector 21 is substantially the same as connector 18 of FIG. 1 except that it features an annular shoulder 14 at opposite ends of sleeve 1 that provide a stop for the end of conduits 3 at a distance within sleeve 1 from the opposite ends thereof that permits a sufficient length of conduits 3 to be contained within sleeve 1 to assure the connection of conduits 3 together when sleeve 1 is contracted thereagainst by heat. Only one conductor 4 passes through conduits 3 and sleeve 1 to illustrate that the connector of the invention is adapted for use in encapsulating at least one electrical conductor or cable or both that extend through sleeve 1 from one conduit 3 to the other. A layer of adhesive 13 is disposed between the outer surface of conduits 3 and the inner surface of sleeve 1 to enhance the securement therebetween when sleeve 1 is contracted against conduits 3 to affect the connection therebetween. As previously described with respect to connector 20, adhesive 13 is of a type that is resistant to the amount of heat required to contract sleeve 1 against conduits 3 and able to bond them together in such a manner as to enhance the securement therebetween. It will be also noted that the layer of material 6 is bonded by adhesive 13 to the inner surface of sleeve 1 and that both adhesive 13 and the material 6 layer extend axially along the length of sleeve 1 between the ends of conduits 3. Although it is preferred to leave a space between the ends of conduits 3 and the opposite ends of the material 6 layer as previously described, the opposite ends of the layer of material 6 may abut against the end of conduits 3 when desired as long as material 6 is able to expand and engulf the electrical conductors and fill sleeve 1 sufficiently to provide a barrier against the flow of vapor through sleeve 1 from one conduit 3 to the other without damage to the conductors.

Figure 6:
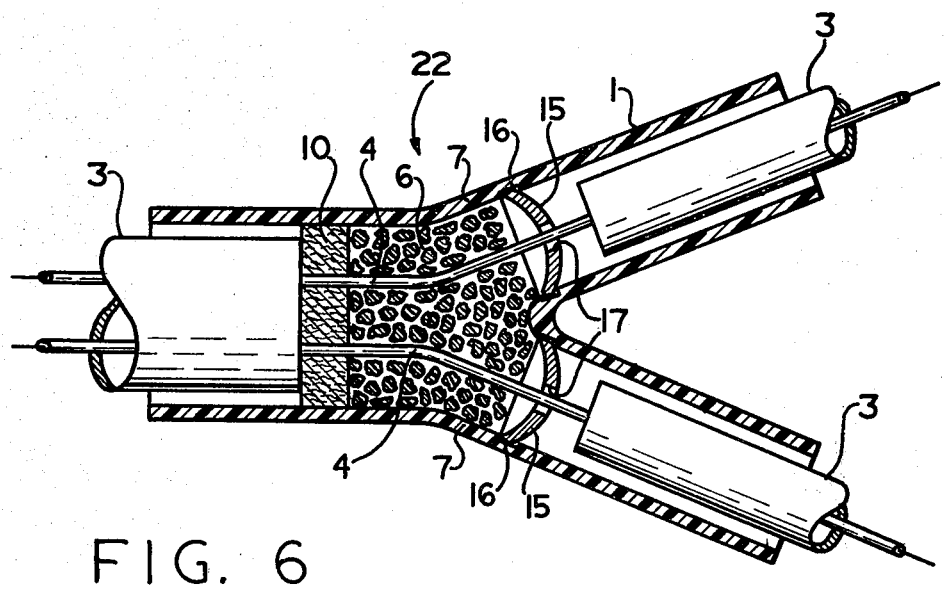

FIG. 6 shows connector 22 of the invention in the expanded state prior to its contraction by heat. Connector 22 when contracted by heat is adapted to connect three spaced-apart conduits 3 together to provide a barrier against the flow of vapor through any of the conduits 3. In the case of connector 22, two electrical conductors 4 extend through one conduit 3 on the viewer's left and branch apart within sleeve 1 so that only one conductor 4 passes through each of the remaining two conduits 3 as shown in FIG. 6. In connector 22, the expandable material 6 layer is not adhered to the inner surface of sleeve 1 but rather is disposed in the form of pellets or particles within sleeve 1. The disposing of material 6 loosely within sleeve between the ends of conduits 3 is illustrative of the fact that although material 6 is preferably contained within sleeve 1 in the form of an annular layer on the inner surface of sleeve 1 and may be secured to the inner surface of wall 7 of sleeve 1 by means of a suitable adhesive as previously described, it may be disposed within sleeve 1 in any suitable manner such as a solid mass or in the form of pellets or particles provided that upon its expansion it is able to engulf conductors 4 and fill sleeve 1 sufficiently to provide a barrier against the flow of vapor through sleeve 1 from one conduit 3 to the other.

As shown in FIG. 6, a barrier member 10 is provided between one end of the material 6 layer and the end of one conduit 3 to inhibit the axial flow of material 6 as previously described. Barrier member 10 is in the form of fibrous packing previously described. Barrier members 15 are disposed between the opposite ends of the remaining two conduits 3 and the opposite end of the layer of material 6. Barrier members 15 like barrier member 10 are adapted to inhibit the axial flow of material 6 into the ends of conduit 3 when material 6 expands during the contraction of sleeve 1 by heat. Barrier members 15 are secured in annular grooves 16 disposed in the inner surface of wall 7 of sleeve 1 and have a suitably sized opening 17 therethrough to permit conductors 4 to pass through sleeve 1 from one conduit 3 to the other as shown in FIG. 6. Barrier members 15 are made from a material that possess sufficient heat resistance to withstand the temperature required to contract sleeve 1 and is flexible enough so as not to inhibit the contraction of sleeve 1 against conduits 3 yet is able to inhibit the axial flow of material 6 into the ends of conduits 3 where such is desired. Barrier members 15 may for example be in the form of a flexible screen which may be made from heat recoverable metallic or polymeric materials. Barrier members 15 like barrier members 10 are illustrative of the fact that, where it is desired to inhibit the axial flow of the expandable material, any suitable means may be used that is able to withstand the heat required to contract the sleeve of the connector of the invention and permit the one or more electrical conductors and/or cables to pass through the sleeve in the manner desired and be flexible enough so as not to interfere with the contraction of the sleeve onto the conduits in the manner herein described.

What is claimed is:

1. An improved connector assembly for connecting the ends of at least two metal conduits together having at least one electrical conductor extending therebetween, said connector of the type comprising a sleeve made from a heat recoverable metallic material having a chamber therewithin enclosed by a wall of the sleeve having an inner and outer surface with at least a portion of the inner surface facing towards the conductor, said sleeve having openings therein communicating with the chamber that are dimensionally adapted to enable the ends of the conduits to be respectively inserted therethrough into the chamber while the sleeve is in an expanded state and permit a wall of the sleeve surrounding the openings to contract radially inwardly to secure the sleeve to the conduits upon exposure of the sleeve to an amount of heat sufficient to cause the contraction thereof, wherein the improvement is characterized by; said chamber having an expandable material disposed therein that is adapted to expand into an expanded material in response to the exposure of the sleeve to the amount of heat sufficient to cause the contraction thereof and to engulf the conductor without damge thereto and fill the chamber sufficiently to provide a barrier against the flow of vapor through the conduits, and said sleeve having stopping means disposed within the chamber to prevent the expandable material from expanding into the ends of the conduits.

2. The connector assembly of claim 1, wherein the expandable material is disposed in the sleeve chamber in the form of a layer on at least a portion of the sleeve wall inner surface facing towards the conductor, said layer dimensionally adapted to permit the conductor to extend between the conductor ends through the sleeve when the sleeve is in the expanded state.

3. The connector assembly of claim 1, wherein the stopping means to prevent the expandable material from expanding into the conduit ends comprises a barrier member disposed within the sleeve chamber between the expandable material and the conduit ends, said barrier member having an opening enabling the conductor to pass therethrough, and said barrier member adapted so as not to inhibit the sleeve from contracting radially inwardly in response to heat.

4. The connector assembly of claim 1, wherein the sleeve wall surrounding the openings has at least one disruption on the inner surface thereof that enhances the securement of the sleeve to the conduit ends when the sleeve is secured thereto in response to the contraction thereof by heat.

5. The connector assembly of claim 1, including adhesive means disposed between the outer surface of the conduits and the inner surface of the sleeve wall surrounding the openings in such a manner as to enhance the securement of the sleeve to the conduits by bonding when the sleeve is secured thereto in response to the contraction thereof by heat.

6. The connector assembly of claim 5 wherein the adhesive means is disposed as a layer on the inner surface of the sleeve wall surrounding the conduit ends.

7. The connector assembly of claim 2 wherein the layer of expandable material is bonded to the inner surface of the sleeve wall facing the conductor by an adhesive.

8. The connector assembly of claim 1 including a layer of adhesive on the conductor that is adapted to bond the conductor to the expanded material to enhance the barrier against the flow of vapor between the conduit end provided by the expanded material.

9. The connector assembly of claim 2 including a layer of adhesive in the inner surface of the layer of expandable material facing towards the conductor that is adapted to bond the conductor to the expanded material to enhance the barrier against flow of vapor between conduit ends provided by the expanded material.

10. The connector assembly of claim 1 wherein the expandable material is a material that expands into a foam in response to the heat.

11. The connector assembly of claim 1, wherein the expandable polymeric material contains an amount of heat activatable cross-linking agent sufficient to crosslink said material in response to heat.

12. The connector assembly of claim 1 wherein the expandable material is an expandable polymeric material.

13. The connector assembly of claim 3 wherein the barrier member is a fibrous material.

14. The connector assembly of claim 13 wherein the fibrous material is a fibrous glass material.

15. The connector assembly of claim 3 wherein the barrier member is made from a heat recoverable metal having a recovery temperature not higher than about the contraction temperature of the sleeve.

16. The connector assembly of claim 3 wherein the barrier member is made from a heat recoverable polymeric material having a recovery temperature not higher than about the contraction temperature of the sleeve.

17. The connector assembly of claim 1, including corrosion resistance means for preventing galvanic corrosion, said means disposed between the outer surface of the conduits and the inner surface of the wall of the sleeve surrounding said openings in the region of securement therebetween.

* * * * *